United States Patent [19]
Katori et al.

[11] Patent Number: 5,599,635
[45] Date of Patent: Feb. 4, 1997

[54] MAGNETIC RECORDING SYSTEM

[75] Inventors: Kenji Katori; Mitsuharu Shouji; Kazuhiko Hayashi, all of Kanagawa, Japan

[73] Assignee: Sony Corporation, Tokyo, Japan

[21] Appl. No.: 305,079

[22] Filed: Sep. 13, 1994

[30] Foreign Application Priority Data

Sep. 13, 1993 [JP] Japan ................ 5-227620

[51] Int. Cl.$^6$ .............. G11B 5/66; G11B 5/74; B32B 9/00
[52] U.S. Cl. .......... 428/692; 428/694 R; 428/694 T; 428/900; 428/64.2; 360/113; 360/119; 360/131; 360/134; 360/135; 360/125; 360/126
[58] Field of Search .............. 428/694 R, 64.2, 428/694 T, 692, 900; 360/113, 119, 131, 134, 135, 125, 126

[56] References Cited

U.S. PATENT DOCUMENTS

| | | | |
|---|---|---|---|
| 4,769,282 | 9/1988 | Tada | 428/336 |
| 4,801,500 | 1/1989 | Yasunaga | 428/336 |
| 5,034,286 | 7/1991 | Nasu | 428/694 TM |
| 5,057,380 | 10/1991 | Hayashi | 428/692 |
| 5,192,618 | 3/1993 | Frankel | 428/457 |
| 5,287,237 | 2/1994 | Kitada | 360/113 |
| 5,302,469 | 4/1994 | Sugenoya | 428/694 T |

*Primary Examiner*—Leszek Kiliman
*Attorney, Agent, or Firm*—Hill, Steadman & Simpson

[57] ABSTRACT

A magnetic recording system for recording signals onto coat-type magnetic tape using magnetic powder by using a magnetic head, and a magnetic recording system for recording signals onto a coat-type magnetic disk using magnetic powder by running magnetic head in contact with the disk, are disclosed. The magnetic tape has a coercive force Hc of 2000 to 3800 Oe in the former system, while the magnetic disk has a coercive force He of 2000 to 3500 Oe in the latter system. In both systems, signals are recorded by using a magnetic head using magnetic core members having a saturation magnetic flux density of 15 kG or greater. The magnetic core member having the saturation magnetic Flux density of 15 kG or greater is exemplified by a material expressed by a composition formula $(Fe_{95.5}Al_1V_{0.5}Nb_{0.5}Cu_{0.5}Ru_2)_{92}N_6O_2$.

9 Claims, 4 Drawing Sheets

MAGNETIC RECORDING SYSTEM

BACKGROUND OF THE INVENTION

This invention relates to a magnetic recording system for writing various information signals onto a magnetic tape or a magnetic disk, and particularly to a novel magnetic recording system to realize high recording density and high reliability.

In the recording system using the magnetic tape, the combination of the magnetic tape and the magnetic head has evolved in the order of a $\gamma\text{-Fe}_2\text{O}_3$ coat-type tape and a ferrite head, $\text{CrO}_2$ and a ferrite head, $\text{Co-}\gamma\text{-Fe}_2\text{O}_3$ and a ferrite head, metallic powder and a sendust head or amorphous head, and a CoNi evaporation tape and a sendust head or amorphous head, to achieve high density magnetic recording.

This evolution depends largely upon evolution of the magnetic recording medium. Stated differently, as the coercive force and the residual magnetic flux density of the magnetic recording medium have increased, reproduction output in a shorter wavelength region is improved. Thus, higher density is achieved.

As a novel recording system, a combination of a Co-Cr vertical magnetic recording medium and a vertical magnetic head, or a combination of a ring head and a Co-O vertical magnetic recording medium, is proposed as in the 79th Studies of Japan Applied Magnetics Institute, Reference 79-2, pages 9 to 16.

However, any of the above combinations has a problem in the rubbing surface between the magnetic tape and the magnetic head. The rubbing surface between the magnetic tape and the magnetic head does not exhibit satisfactory durability and is damaged by the medium.

Thus, the vertical magnetic recording using Co-Cr and the like has not overcome the problem in reliability for the novel magnetic recording medium.

Meanwhile, an attempt to raise the coercive force Hc of the magnetic tape in an in-plane medium is described in the 79th Studies of Japan Applied Magnetics Institute, Reference 79-2, page 15, from line 9, as follows: "By arraying acicular particles of an average coercive force of approximately 3000 Oe having similar particle diameter and size, densely and without having magnetic interaction in the longitudinal direction to have a thickness of tens of rim, information can be written with ultra high resolution of 10,000 bits/mm or higher with a bit interval of 100 nm or smaller."

However, the higher coercive force of the medium is limited by writing capability of the magnetic head.

A recording system using a magnetic head having a magnetic core composed of sendust or Co based amorphous has been conventionally employed, while it has not been conceived to raise the coercive force of the coat-type tape to 2000 Oe or higher in the magnetic recording system capable of recording and reproduction.

This is partly because the study in the field of the novel magnetic recording system is now on the Co based evaporation tape or the Co-Cr vertical magnetic recording, as seen from the above-mentioned reference publication. The coat-type medium is studied simply for lower costs and higher reliability, not for research and development of ultra high recording density media.

As described above, the study for more than a decade on the vertical magnetic recording system has not brought it to the stage of practical application to replace the Co based evaporation tape. A highly reliable magnetic recording system for a higher density has not been proposed since practical application of the Co based evaporation tape in 1989.

Since high resolution of TV picture as represented by HD-VTR increases information to be recorded, development of a magnetic recording system capable of recording with a higher density to replace the Co based evaporation tape is desired.

OBJECT AND SUMMARY OF THE INVENTION

It is therefore an object of the present invention to provide a magnetic recording system capable of achieving high density recording and having high output and reliability.

According to the present invention, there is provided a magnetic recording system employing a coat-type magnetic tape using magnetic powder. The magnetic recording system has a magnetic tape having a coercive force Hc of 2000 to 3300 Oe, and a magnetic head using magnetic core members having a saturation magnetic flux density of 15 kG and greater for recording signals. According to the present invention, there is also provided a contact-type magnetic recording system employing a coat-type magnetic disk using magnetic powder. The magnetic recording system has a magnetic disk having a coercive force Hc of 2000 to 3500 Oe, and a magnetic head using magnetic core members having a saturation magnetic flux density of 15 kG for recording signals.

Thus, by using the coat-type magnetic media of extremely high coercive force and the magnetic head using the magnetic core members of high saturation magnetic flux density for recording, it is possible to secure sufficient reliability and achieve recording with higher density than that of the evaporation tape, which has been capable of recording with higher density than any other conventional tape contact-type magnetic recording system.

Since the magnetic recording system of the present invention uses the coat-type tape having high durability, the problem of rubbing between the tape and the head in the vertical magnetic recording system using the Co-Cr medium can be solved.

Also, the magnetic recording system of the present invention uses the magnetic core member having high saturation magnetic flux density for recording, recording in an MP tape having a large coercive force Hc can be achieved, and reproduction output exceeding that of an ME tape can be produced. Consequently, high density magnetic recording of a great amount of information as in HD-VTR can be realized.

DETAILED DESCRIPTION OF THE INVENTION

Figure 1:
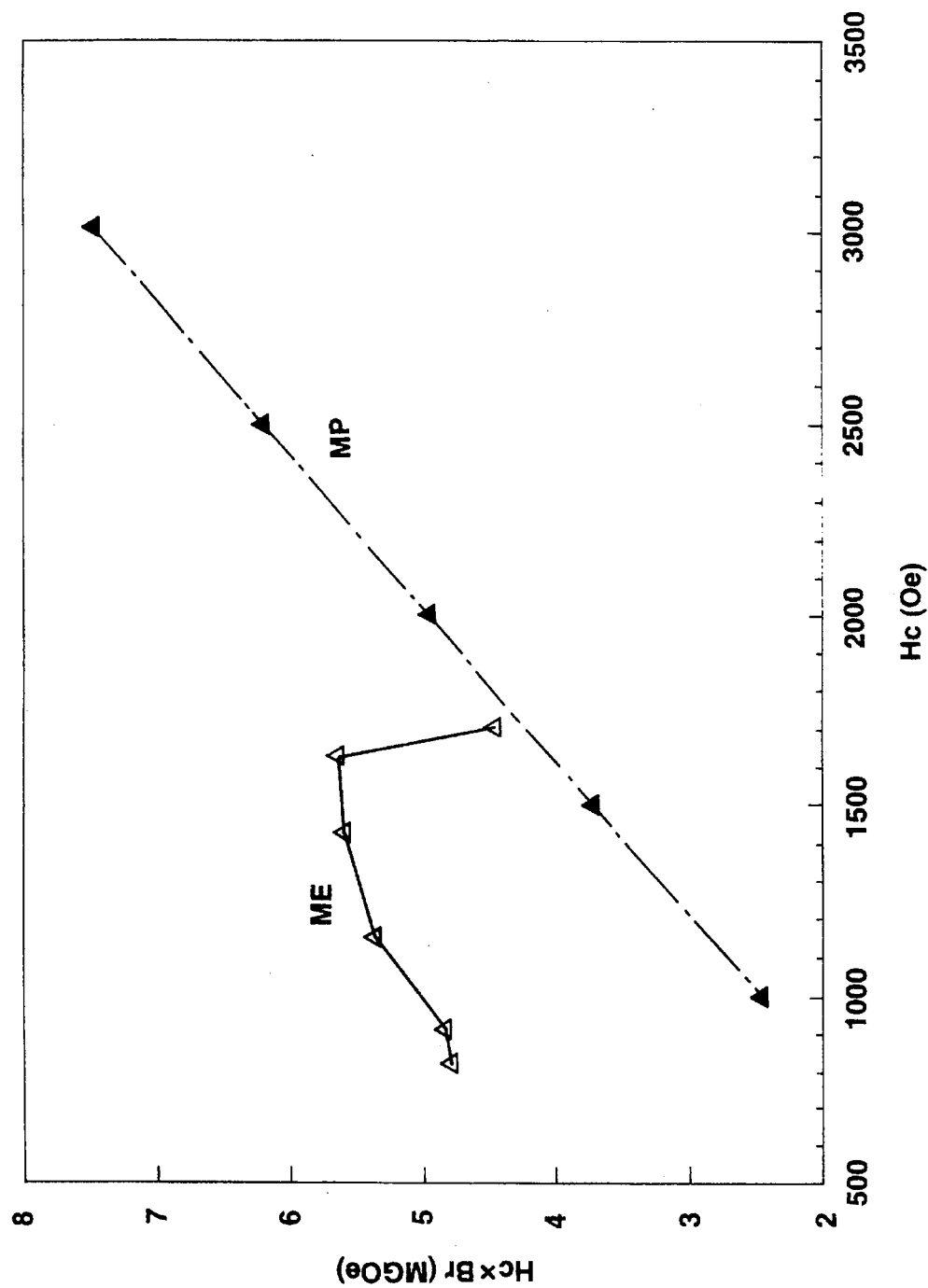
FIG. 1 is a graph showing relations between the coercive force Hc of an MP tape and an ME tape, and the product (Hc×Br) of the coercive force as a performance index of the magnetic tape and the residual magnetic flux density.

In the present invention, signals are first recorded by a magnetic head using magnetic core members having a saturation magnetic flux density of 15 kG or greater. Conventionally, a high Hc region of 1700 Oe or higher has not conceived because of limitation of the recording head. However, as proposed by the present Applicant, magnetic core members exhibiting a saturation magnetic flux density Bs of 19 kG or greater, which is nearly twice that of the conventional sendust, and having sufficiently high corrosion resistance and wear resistance, are available. Thus, the high Hc region can be conceived, and superiority of the coat-type magnetic tape using metallic powder, hereinafter referred to as an MP tape, is now made apparent.

As the magnetic core member used in the present invention, any magnetic core member having the saturation magnetic flux density of 15 kG as described above can be used. For instance, an alloy material expressed by a composition formula $(Fe_aM_bCu_cRu_d)_eN_fO_g$, with a, b, c, d, e, f, g expressing the composition by atomic percentage, and M representing at least one of Si, Al, Ta, B, Mg, Ca, St, Cr, Mn, Zr, Nb, Ti, Mo, V, W, Hf, Ga, Ge and rare earth elements. The composition range is as follows:

$0.1 \leq b \leq 5$ $0 \leq c \leq 8$ $0 < d \leq 5$ $0.2 \leq c+d \leq 8$ $a+b+c+d=100$ $0.5 \leq f \leq 15$ $0.1 \leq g \leq 13$ $e+f+g=100$ The additional element M may be a combination of $M'$ as at least one of Al, Ga, Ti and rare earth group, and $M''$ as at least one of Nb, Ta, V, Ze, Hr. In this case, the material is expressed by a composition formula $(Fe_aM'_jM''_kCu_cRu_d)_eN_fO_g$. The composition range is as follows:

$0.1 \leq j \leq 2.5$ $0.15 \leq k \leq 2.5$ $0 \leq c \leq 8$ $0 < d \leq 5$ $0.2 \leq c+d \leq 8$ $a+j+k+c+d=100$ $0.5 \leq f \leq 15$ $0.1 \leq g \leq 13$ $e+f+g=100$ Meanwhile, a magnetic flux density 6 to 7 times greater than the coercive force Hc of the magnetic tape is conventionally required for the magnetic core member of the recording head. In the case of the magnetic tape of coercive force Hc, the saturation magnetic flux density Bs of the magnetic core member is 12 to 14 kG for the magnetic tape having a coercive force Hc of 2000 Oe, while the magnetic tape capable of recording the magnetic head using the magnetic core member having a saturation magnetic flux density Bs of 19 to 20 kG has a coercive force Hc of approximately 3000 Oe.

The magnetic powder may have a coercive force of approximately 3500 Oe through improvement in acicular ratio of particles and diminution of the surface oxidation layer. However, it is preferred to set the coercive force Hc of the magnetic tape to 2000 to 3000 Oe because of the limitation on the side of the magnetic head as described above. Although the description is mainly of the magnetic tape so far, the same can be true of the contact-type magnetic disk such as a floppy disk.

In the present invention, since the coat-type magnetic recording medium having high durability is used, the problem in durability as pointed out in the vertical recording is eliminated.

Also, the superiority in reproduction output of the coat-type magnetic recording medium to that of the conventional Co based evaporation tape will be later described.

The coat-type magnetic recording medium, particularly a metal tape (MP tape) for high density magnetic recording, employs a recording medium composed of fine particles of Fe-Co alloy consisting mainly of Fe. In this case, the crystal magnetic anisotropy of the magnetic alloy is low, and the large coercive force is caused by anisotropy in shape of the acicular particles. With the anisotropy in shape, the coercive force increases as the acicular ratio increases or as magnetization increases. If the magnetization of the particles increases by thinning the surface oxidation layer of the magnetic powder, the coercive force increases. The magnitude of magnetization and the coercive force are in conformity with each other for improving properties.

In the Co based evaporation tape, the crystal magnetic anisotropy of the Co based alloy causes the coercive force. The crystal is isolated and diminished to introduce a large coercive force. An inclined evaporation method is used to isolate the crystal, and oxygen is introduced to produce finer crystals. In order to raise the coercive force, it is necessary to increase the amount of oxygen introduced to produce finer Co based crystal grains. However, as described in the 79th Studies of Japan Applied Magnetics Institute, Reference 79-5, page 33, the introduction of oxygen increases the surface oxidation layer of Co particles or the gap between Co particles, and lowers the magnetization. In short, in the ME tape, a greater coercive force lowers tape magnetization.

The capability of recording information onto the magnetic tape with a high density is expressed by performance indices $(\delta MrHc)^{0.6}$ and $(\delta Mr/Hc)^{-0.4}$ with $\delta$ denoting the film thickness and Mr denoting the residual magnetic flux density of the tape, as described in the 79th Studies of Japan Applied Magnetics Institute, Reference 79-2, page 14. The index $(\delta MrHc)^{0.6}$ is proportional to the residual magnetic flux density of the tape surface with a low density, while the index $(\delta Mr/Hc)^{-0.4}$ is proportional to the recording density for halving the residual magnetic flux density. That is, it is preferred that both indices are at large values.

Figure 2:
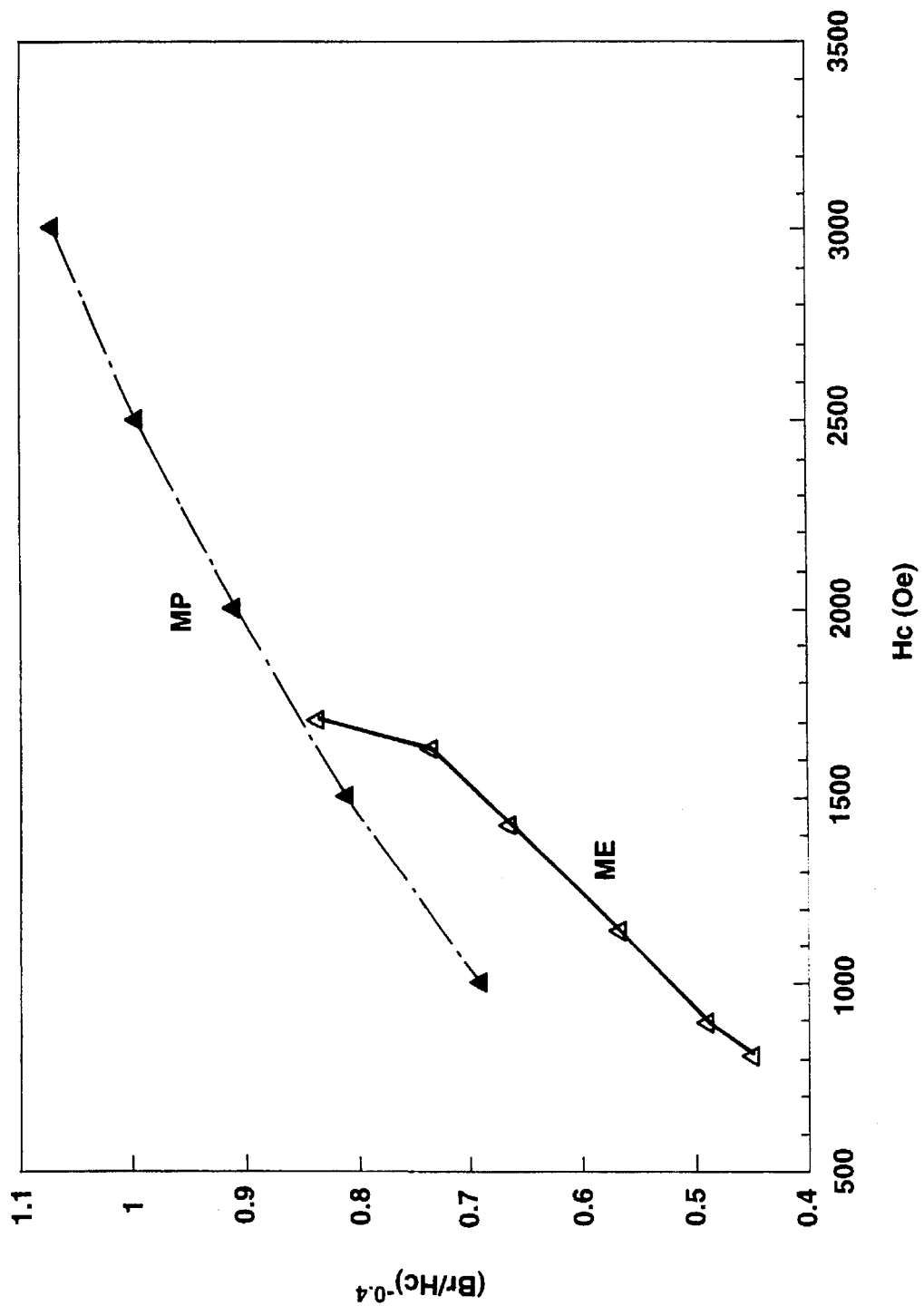
FIG. 2 is a graph showing relations between Hc of the MP tape and the ME tape and $(Br/Hc)^{-0.4}$.

FIGS. 1 and 2 show graphs in which the coercive forces Hc, as parameters, of an ME tape (CoNi-O) and an MP tape (Br:2500 G) are plotted. The thickness of the magnetic layer differs between 2000 Å in the ME tape and 3 μm in the MP tape. However, the effective recording thickness is set to ¼ of the recording wavelength. With a recording wavelength of 0.5 μm, both tapes have the same effective recording thickness. Therefore, the thickness $\delta$ is negligible. Mr and Br denote the same residual magnetic flux density. The index $(\delta Mr/Hc)^{-0.4}$ exhibits a higher value in the MP tape in the entire region, because of the relatively low Br in comparison to Hc of the MP tape.

Hr×Br is superior in the ME (evaporation) tape with the current coercive force Hc of approximately 1500 Oe. The difference in Hr×Br expressed by dB is approximately 5 dB, which substantially corresponds to the output difference between the ME tape and the MP tape. With the current coercive force Hc, the ME tape produces superior reproduction output. However, with a higher Hc, the magnetization of the ME tape is lowered, deteriorating Hc×Br as shown in FIG. 1. In the case of the MP tape, high Hc and high Br are in conformity with each other as described above, and Br can be maintained substantially at a constant level even with higher Hc. Consequently, in the high Hc region of 2000 Oe, the MP tape exceeds the ME tape in the maximum value, producing high reproduction output.

This is not true of a non-contact type magnetic disk such as a hard disk. The medium producing conditions of the non-contact type magnetic disk differ from those of the contact-type magnetic disk, and recording media of high Hr and high Br can be easily produced.

A preferred embodiment of the present invention will now be described in detail with reference to the drawings and experiment results.

Figure 3:
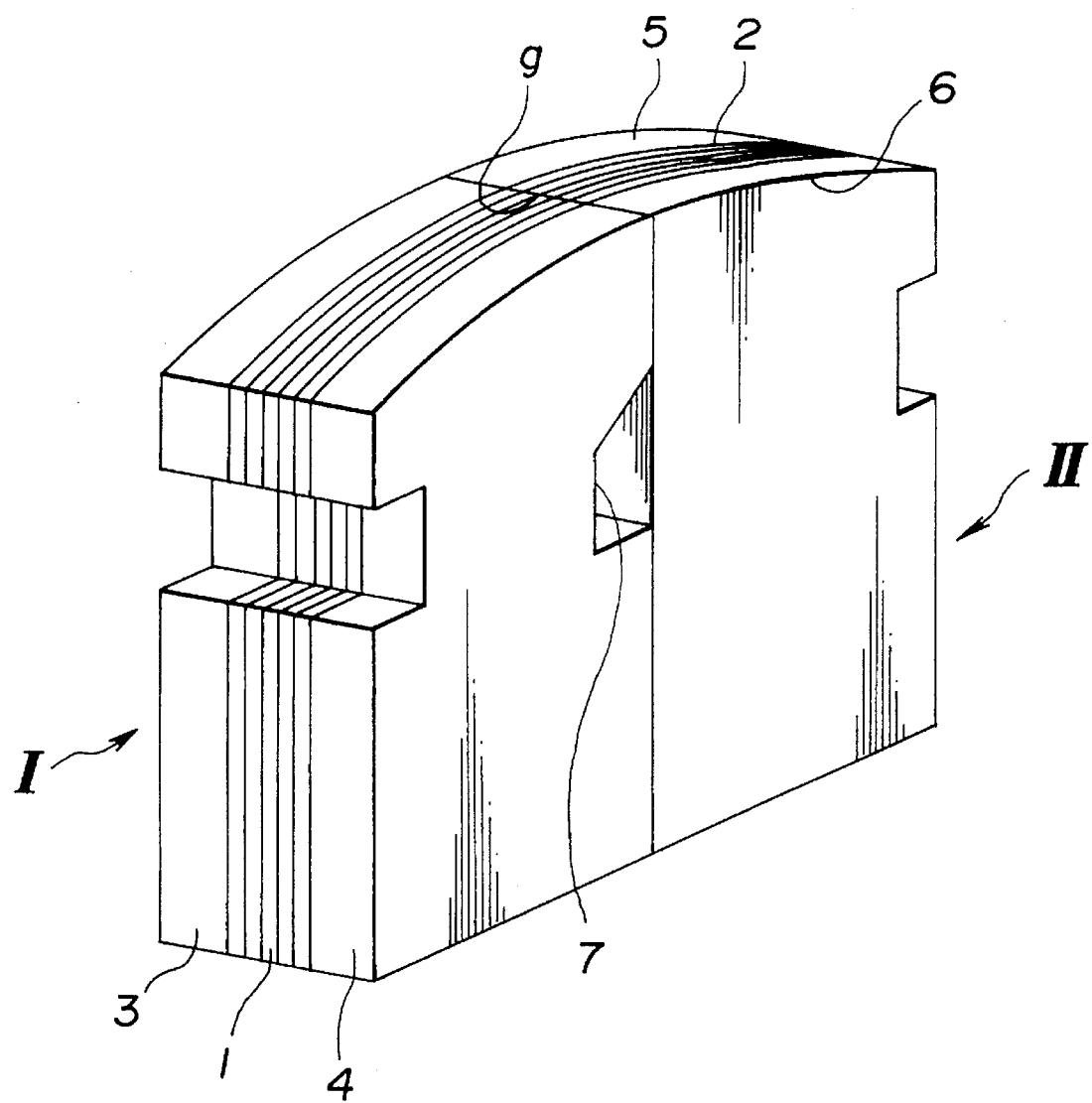
FIG. 3 is a perspective view showing a laminate-type magnetic head produced by using magnetic core members having high saturation magnetic flux density.

First, a magnetic head used in the present embodiment is described. For the magnetic core member, an alloy material having a composition $(Fe_{95.5}Al_1V_{0.5}Nb_{0.5}Cu_{0.5}Ru_2)_{92}N_6O_2$, with the numerical values expressing the composition by atomic percentage, was used. The alloy material had a saturation magnetic flux density Bs was 19 to 20 kG. The alloy material and the insulating layer composed of $SiO_2$ were stacked with a thickness of 3 μm each, to form a hierarchical structure. Thus, a laminate-type head was produced. The laminate head is shown in FIG. 3.

The magnetic head has magnetic core halves I, II composed of magnetic core members 1, 2 sandwiched by guard members 3 and 4, and guard members 5 and 6, respectively. The magnetic core half I has a winding groove 7 formed therein. The magnetic core halves I, II are abutted to each other via a gap member, with end surfaces of the magnetic core members 1, 2 abutted to each other. The magnetic core halves I, II are bonded into one unit to form a magnetic gap g.

Figure 4:
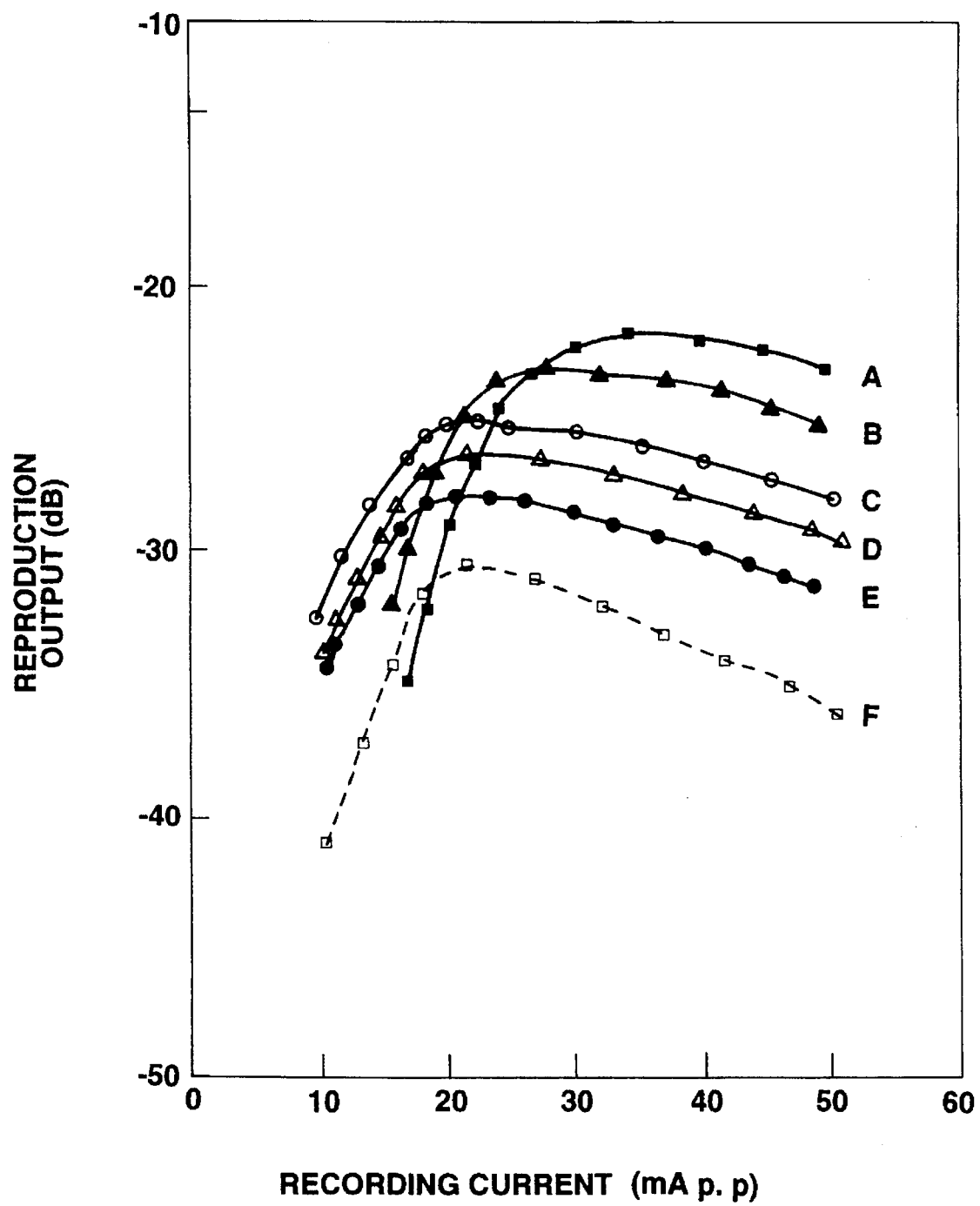
FIG. 4 is a graph showing relations between the recording current for recording in the MP tape and the ME tape having various coercive forces, and the reproduction output.

A recording/reproduction test for various magnetic tapes of different coercive forces, that is, MP tapes and ME tapes, was conducted by using the laminate head, with a relative speed between the magnetic tape and the magnetic head of 3.8 m/second, a gap length of the magnetic head of 0.2 μm, and a recording frequency of 7 MHz. Results are shown in FIG. 4. In FIG. 4, lines A to F show characteristics of an MP tape with a coercive force Hc=3000 Oe, an MP tape with Hc=2500 Oe, an ME tape with Hc=1400 Oe, an MP tape with Hc=2000 Oe, an ME tape with Hc=1700 Oe, and an MP tape with Hc=1500 Oe, respectively.

With Hc of approximately 1500 Oe, the ME tape is highly superior to the MP tape. The MP tape with Hc=2000 Oe has the maximum value close to that of the ME tape. In consideration of properties such as durability, the MP tape of Hc=2000 Oe is preferred. With a higher coercive force Hc, the MP tape has superior reproduction output. The above test, which cannot be carried out by using the conventional magnetic head, can be carried out for the first time by using the magnetic head employing the magnetic core members having a high saturation magnetic flux density.

As the same test as in the magnetic tapes was carried out using a coat-type floppy disk and an evaporation disk, the perfectly same result was obtained.

What is claimed is:

1. A high density magnetic recording system comprising:
   a magnetic powder-coated magnetic tape having a coercive force Hc of from about 2000 to about 3300 Oe and a magnetic head including a pair of magnetic core halves bonded together in abutting relationship to define a magnetic gap, each core half including an alloy core having a saturation magnetic flux density of 15 kG and greater for recording signals;
   wherein said alloy core has a composition of the formula: $(Fe_aM_bCu_cRu_d)_eN_fO_g$, wherein M is at least one member selected from the group consisting of: Si, Al, Ta, B, Mg, Ca, Sr, Cr, Mn, Zr, Nb, Ti, Mo, V, W, Hf, Ga, Ge and rare earth elements;
   a, b, c, d, e, f and g are composition percentages; and
   $0.1 \leq b \leq 5$,
   $0 \leq c \leq 8$
   $0 < d \leq 5$
   $0.2 \leq c+d \leq 8$
   $a+b\ c+d=100$
   $0.5 \leq f \leq 15$
   $0.1 \leq g \leq 13$
   $e+f+g=100$.

2. A high density magnetic recording system as defined in claim 1, wherein said alloy core has a composition of the formula: $(Fe_{95.5}Al_1V_{0.5}Nb_{0.5}Cu_{0.5}Ru_2)_{92} N_6O_2$.

3. A high density magnetic recording system as defined in claim 1, wherein said magnetic head further includes guard members sandwiching the alloy cores and the magnetic gap is formed between end surfaces of the magnetic core halves.

4. A high density magnetic recording system as defined in claim 1, wherein the magnetic powder comprises particles of Fe-Co alloy.

5. A high density magnetic recording system as defined in claim 1, wherein the magnetic head is a laminated magnetic head.

6. A high density magnetic recording system comprising:
   a magnetic powder-coated magnetic disk having a coercive force Hc of about 2000 to about 3500 Oe and a magnetic head including a pair of magnetic core halves bonded together in abutting relationship to define a magnetic gap, each core half including an alloy core having a saturation magnetic flux density of about 15 kG for recording signals;
   wherein said alloy core has a composition of the formula:
   $(Fe_aM_bCu_cRu_d)_eN_fO_g$, wherein M is at least one member selected from the group consisting of: Si, Al, Ta, B, Mg, Ca, Sr, Cr, Mn, Zr, Nb, Ti, Mo, V, W, Hf, Ga, Ge and rare earth elements;
   a, b, c, d, e, f and g are composition percentages; and
   $0.1 \leq b \leq 5$,
   $0 \leq c \leq 8$
   $0 < d \leq 5$
   $0.2 \leq c+d \leq 8$
   $a+b+c+d=100$
   $0.5 \leq f \leq 15$
   $0.1 \leq g \leq 13$
   $e+f+g=100$.

7. A high density magnetic recording system as defined in claim 6, wherein said alloy core has a composition of the formula: $(Fe_{95.5}Al_1V_{0.5}Nb_{0.5}Cu_{0.5}Ru_2)_{92} N_6O_2$.

8. A high density magnetic recording system as defined in claim 6, wherein said magnetic head further includes guard members sandwiching the alloy cores and the magnetic gap is formed between end surfaces of the magnetic core halves.

9. A high density magnetic recording system as defined in claim 6, wherein the magnetic powder comprises particles of Fe-Co alloy.

* * * * *